HALL EFFECT FREQUENCY CONTROL IN OSCILLATING CIRCUITS

Filed Feb. 7, 1964

United States Patent Office 3,290,616
Patented Dec. 6, 1966

3,290,616

HALL EFFECT FREQUENCY CONTROL IN OSCILLATING CIRCUITS

Joël Guyot and Bernard Letellier, Paris, France, assignors to CSF-Compagnie Generale de Telegraphie Sans Fil, a corporation of France
Filed Feb. 7, 1964, Ser. No. 343,353
Claims priority, application France, Feb. 12, 1963, 924,500, Patent 1,356,360
2 Claims. (Cl. 331—177)

The present invention relates to oscillating circuits.

It is known that, by providing in an oscillating circuit, including a capacitor and an inductance coil, a feedback with phase-shaft, the reactance of the circuit is varied.

It is an object of the invention to provide an improved arrangement for varying the oscillating frequency of an oscillating circuit.

According to the invention this arrangement is based on the Hall effect.

The invention is applicable to variable frequency oscillators, stabilized frequency transmitters, frequency modulators and, more generally, each time the frequency of an oscillator has to be adjusted.

It is known that, by the term "Hall effect," is meant a phenomenon according to which, if a current of intensity I is made to flow in a semi-conductor placed in a magnetic field B, a potential difference is established in a circuit normal both to the conductor carrying current I and field B, whose magnitude is a function of the vector or cross product $\vec{I} \times \vec{B}$ being vectors whose magnitudes are proportional to I and B and whose directions are respectively the direction of the current I and of the magnetic field B. A Hall effect probe includes, for example, a semi-conductor plate, connected to two leads through which a current I is caused to flow. If a field B is directed normally to the plate, a voltage is collected at the terminal of two output electrodes normal to the above leads and to field B.

According to the invention, a Hall plate is used for collecting a current or voltage magnitude at a point in a resonant circuit, and a voltage or current derived from the Hall plate is fed back to the circuit, at a different point, so as to have the magnitude fed back in quadrature with the same magnitude at that point. The control field of the Hall crystal controls the amplitude and phase-shift (lag or lead) of the feedback component.

The invention is applicable for providing frequency stabilized oscillators, this stabilization being achieved by making the reinjection, dependent upon the frequency difference between the actual oscillator frequency and the desired frequency.

By suitable electromagnetic coupling, the respective roles of the control field and the supply current of probes can be inverted. As a particular case the field control coil and the resonant circuit coil can be the same, the amount of feedback and phase-shift direction (lagging or leading) being then controlled by the intensity and polarity of the D.C. control current of the probe.

The invention will be best understood from the following description and appended drawing in which.

The same reference letters have been used throughout all the figures to designate the same elements.

Figures 1, 2, 3, 4:
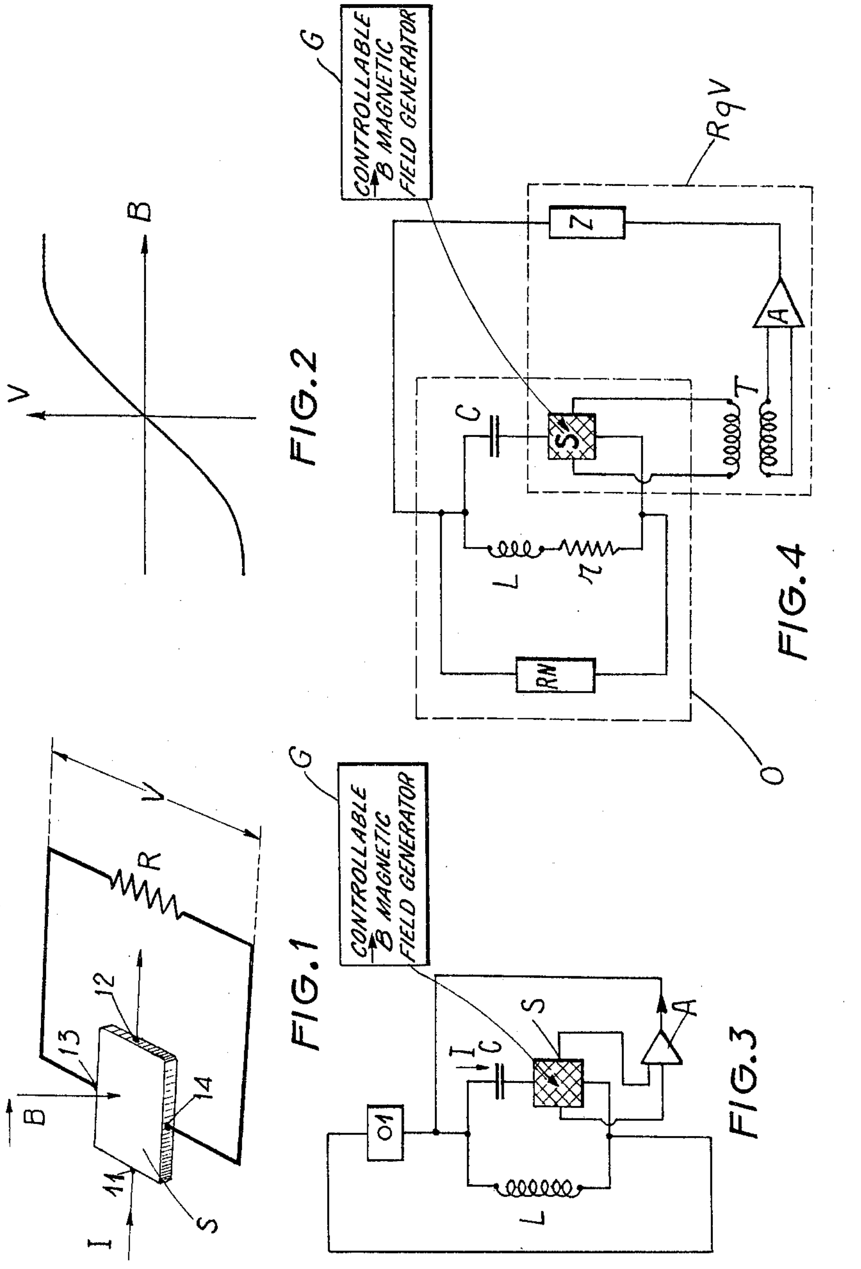
FIG. 1 is a schematic view of a Hall effect probe.
FIG. 2 shows the variation of the voltage collected at the terminals of a Hall effect probe as a function of the magnetic field applied.
FIG. 3 is a diagrammatic view of one embodiment of the invention.
FIG. 4 is a more elaborate diagram of the arrangement shown in FIG. 3.

FIG. 1 shows a semi-conductor plate S having two input electrodes 11 and 12 and two output electrodes 13 and 14, positioned as shown in the figure. A resistor R is connected to terminals 13 and 14. When a magnetic field B is applied to plate S, this field not being parallel to current I flowing from input 11 to output 12, a voltage V appears across terminals of resistance R.

For a given field B, perpendicular to the plate, it can be seen that $V=kIB$, $k$ being a constant dependent only on the nature of the plate substance, and its geometric characteristics; $k$ is practically independent of temperature.

FIG. 2 shows the variations of voltage V at outputs 13 and 14 versus the variations of field B, for a constant current I. The curve is symmetrical and the variations are linear as long as the plate is not saturated.

FIG. 3 shows a circuit according to the invention.

The circuit of FIG. 3 comprises an oscillator including an energy driving system O1, and a parallel resonant circuit with an inductance coil L and a capacitor C. A Hall plate S' is inserted in the resonant circuit in the same conditions as in FIG. 1. A controllable magnetic field generator G supplies a variable magnetic field B perpendicular to plate S. Generator G is entirely conventional. However, for the sake of the clarity of the figures, generator G is shown outside although it is to be understood that in fact it is placed so that plate S is submitted to field B. The Hall voltage thus obtained is applied to an amplifier A. Plate S has a negligible resistance and does not affect notably the resonant circuit characteristics.

Current I flowing through plate S leads the voltage at the terminals of capacitor C by 90°. The resistance of plate S being very low, current I can be considered as leading the voltage at the terminals of the parallel resonant circuit by 90°.

The output current of plate S, which is proportional to current I and field B in magnitude and sign, is, after amplification, fed back into the resonant circuit. The feedback voltage is in phase with the current in the plate, which current is in quadrature with the voltage on which the feedback voltage is superimposed. Accordingly, the feedback loop is reactive. As taught, for example, in "Electrical and Electronic Engineering Series" by Terman (McGraw-Hill) page 494, or in "Radio Communications Series" by Hund (McGraw-Hill) pages 155–162, ch. II, the adding of this out-of-phase magnitude to the oscillator supply current results in a variation of the tuning frequency which reestablishes the normal phase relationship between current and voltage in the resonant circuit.

FIG. 4 shows in more detail the circuit of FIG. 3. In this example, the driving system of the oscillator, O, is a negative resistance generator RN. The distributed resistance of the circuit is shown as a lumped resistance $r$. The Hall plate S is coupled to amplifier A through a transformer T. Amplifier A feeds the resonant circuit through a matching impedance Z, which can be of any suitable type, such as a two or four terminal network, a transistor or a tube, for example.

The frequency variation obtained according to the invention as explained above can, as is known, be obtained by mounting a variable impedance in parallel with capacity C. Therefore the circuit comprising plate S, transformer T, amplifier A and impedance Z may be considered as equivalent to a variable impedance $R_qV$.

The invention is, of course, not limited to the particular arrangements described and shown in the drawing, which were given solely by way of example.

What is claimed is:

1. An arrangement for controlling the frequency of an oscillating circuit comprising a parallel resonant circuit having two branches, said arrangement comprising: a Hall plate having two first terminals and two second terminals, said plate being inserted by means of said first terminals in one of said branches; means for coupling said second terminals to a point common to said branches; and means for applying a controllable magnetic field to said plate.

2. An arrangement according to claim 1, said coupling means comprising amplifying means having an input and an output; means for coupling said second terminals to said input of said amplifying means; and an impedance having an input coupled to said output of said amplifying means and an output coupled to said point common to said branches.

References Cited by the Examiner

UNITED STATES PATENTS

| | | | |
|---|---|---|---|
| 1,778,796 | 10/1930 | Craig. | |
| 2,986,711 | 5/1961 | Kuhrt et al. | 332—51 |
| 2,988,707 | 6/1961 | Kuhrt et al. | 331—107 |

ROY LAKE, *Primary Examiner.*

J. B. MULLINS, *Assistant Examiner.*